United States Patent [11] 3,603,989

[72] Inventor James W. Caspers
 San Diego, Calif.
[21] Appl. No. 463,070
[22] Filed June 7, 1965
[45] Patented Sept. 7, 1971
[73] Assignee The United States of America as
 represented by the Secretary of the Navy

[54] TWO-STAGE RADAR SYSTEM
 12 Claims, 1 Drawing Fig.
[52] U.S. Cl. .................................................. 343/5 R,
 343/11 R, 343/13 R, 343/17.1 R
[51] Int. Cl. ....................................................... G01s 9/02
[50] Field of Search ........................................... 343/5 DP,
 100.7, 12, 13, 14, 17.1, 17.2, 11

[56] References Cited
 UNITED STATES PATENTS
3,167,738 1/1965 Westerfield .................. 343/13 X
3,253,277 5/1966 Preston et al. ................ 343/17.1 X Primary Examiner—Malcolm F. Hubler
Attorneys—Louis A. Miller, Paul N. Critchlow and John W. McLaren CLAIM: 1. An improved multiple-resolution-element radar system comprising; means for developing multiple-resolution-element data having a first order of resolution; means for developing multiple-resolution-element data having a second order of resolution within said first order multiple-resolution-element data, said second order being of substantially finer resolution than said first order; a sequential signal detector arranged to receive said first order multiple-resolution-element data, said sequential detector being responsive to said received first order data for producing a first output or a second output indicative of the absence or presence of signal in said first order data, respectively; a second detector arranged to receive said second order multiple-resolution-element data, said second detector being operative for resolving the presence of signal within an incremental element of said second order of resolution and producing an output indicative thereof; and means responsive to said first output of said sequential detector or said output of said second detector for causing said system to develop a new sequence of multiple-resolution-element data.

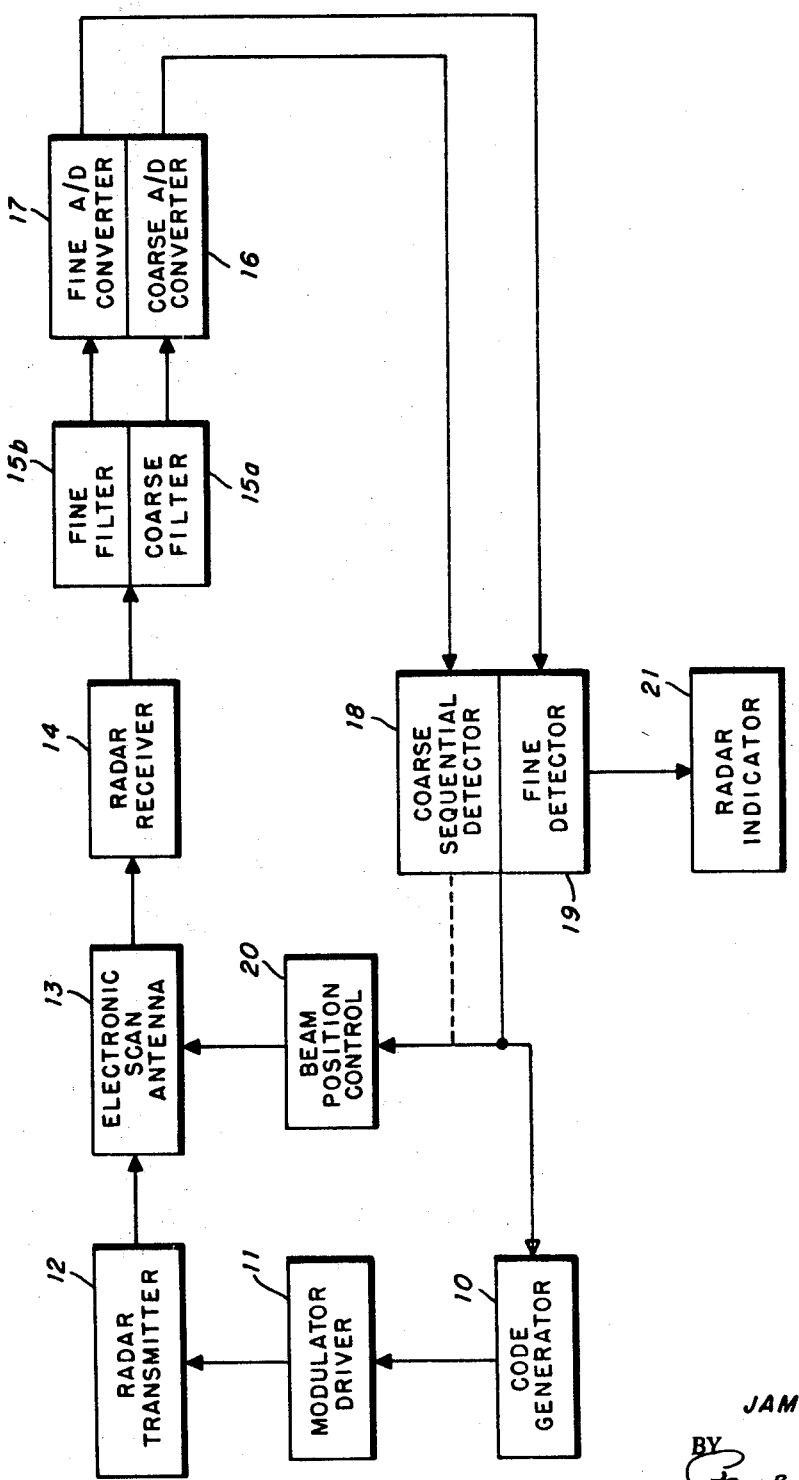
INVENTOR.
JAMES W. CASPERS
ATTORNEYS

TWO-STAGE RADAR SYSTEM

The invention described herein may be manufactured and used by or for the Government of the United States of America for governmental purposes without the payment of any royalties thereon or therefore.

This invention relates to an improved radar system and more particularly to such a system which is especially designed and adapted to develop multiple-resolution-element data with two degrees of fineness. The present invention is particularly advantageous in maximizing the efficacy of sequential type detection techniques as applied to multiple-resolution-element data such as range or velocity, for instance, as developed in a radar system.

One of the most desirable advantages of the sequential type detector, as contrasted to the best nonsequential or fixed sample detectors, is that considerably shorter decision time may be required to reach a decision as to whether a particular element or sequence of data contains signal or has no signal contained therein. A sequential detector attains this timesaving advantage by processing data for signal detection purposes through the use of a sequential sampling techniques rather than through fixed or predetermined data sampling and such timesaving can be converted to provide significantly increased sensitivity to weak signals by sequential detection techniques employed for time periods commensurate with the time required for fixed sample detection. By contrast, a fixed sample or nonsequential detector detects signals on the basis of a fixed number of observations and accordingly can involve unnecessary observations being made after a decision might have been reached indicating either the presence or absence of signal in the data and consequently is limited in the detection of weak signals. Sequential detection techniques may be adapted to utilization in radar systems involving multiple-resolution-element data where it is desired not only to detect the presence or absence of signal in the data, but upon reaching a decision that signal information is contained in the data, to further establish the signal information within a particular multiple-resolution-element such as a range increment, for instance. Thus, for a given radar beam position assuming azimuth and elevation angles remaining fixed, targets along a radar beam at different ranges may be detected. In order to detect targets at different ranges the data must be processed and the signal which is detected therein must be located in time or range increments. In such multiple-resolution-element radar systems the multiple increments of range are frequently referred to as range bins.

As will be readily appreciated by those skilled in the art, such multiple-resolution-element radar systems may include a great number of range bins in order to achieve a desirable degree of resolution in the detection of significant signal information contained in the data processed by the system. It is an inherent characteristic of sequential detecting techniques, however, that an increased number of range bins, for instance, reduces the efficacy of the sequential technique as contrasted to the advantage which it may otherwise represent over nonsequential or fixed sample techniques. Thus, a sequential detection system employing 1,000 range bins may have very little advantage over fixed sample techniques in terms of timesaving and consequent increased sensitivity to weak signals. However, a sequential detector having 10 range bins would have significant advantages over fixed sample techniques. For instance, a sequential detection system having only several range bins for the processing of multiple-resolution-element data may represent an advantage of the order of 10 db. more sensitivity than a comparable fixed sample detection system. However, in a similar sequential detection system having 1000 range bins, the advantage of sequential detection techniques may be only 2 db. more sensitivity than fixed sample techniques.

In a publication entitled, "Sequential Detection in Radar with Multiple Resolution Elements," by Marcus and Swerling and appearing in the "IRE Transactions on Information Theory," Volume IV-8, No. 3, Apr. 1962, both the decrease in sensitivity as a result of an increased number of multiple-resolution elements and the power savings of the sequential detection techniques as compared with fixed sample techniques are illustrated graphically. The power savings are considered to be the reciprocal of the ratio of the signal-to-noise ratio of the fixed sample test to the corresponding signal-to-noise ratio of the sequential test and the ratios are expressed in decibels.

The present invention contemplates maximizing the advantages of the employment of sequential detection techniques without the sacrifice of a desirable degree of fine resolution in processing multiple-resolution-element radar data. Accordingly, the present invention conceives developing multiple-resolution-element data having a first order of resolution which may be referred to as the "coarse data" and means for developing additional multiple-resolution-element data within the first order or coarse resolution data, wherein the additional data has a second order of resolution which is of substantially finer resolution than the first order data. The second order of multiple-resolution-element data may be referred to as the "fine data" in contrast to the "coarse data".

The invention in one form may comprise a sequential signal detector arranged to receive the first order or coarse multiple-resolution-element data for producing a first or second output indicative of either the absence or presence of signal in the first order data, respectively. A second detector, which may be either the sequential, fixed sample, or other type, is arranged to receive the second order or fine multiple-resolution-element data so as to resolve the presence of signal within the fine incremental element of the second order data and produce an output signal indicative thereof, which signal may be used on a conventional radar indicator provide the input to an electronic computational device, or further processed as desired. When either of two conditions exist, i.e. (1) the sequential signal detector produces its first output indicative of the absence of signal information within the received coarse data or (2) when signal data is detected in the coarse input data and the second detector then produces its output establishing the presence of the signal within a fine resolution increment, the radar system is caused to develop a new sequence of multiple-resolution-element data such as may be achieved by moving the radar beam to a new position of elevation or azimuth or both.

Accordingly, it is a primary object of the present invention to improve the performance of a radar system by enhancing the advantages of sequential signal detection techniques such as significantly improved sensitivity when employed in a multiple-resolution-element system wherein a fine degree of resolution is desired.

Another object of the present invention is to improve the performance of a radar system by employing fine and coarse detection stages, each of which is adapted to maximize the advantages inherent in the detection techniques employed.

Yet another object of the present invention is to provide such a multiple-resolution-element radar system wherein both fine and coarse data are developed and wherein the fine data is of substantially finer resolution of a selected multiple-resolution-element increment than the coarse data.

A further object of the present invention is to provide an improved multiple-resolution-element radar system wherein a sequential detector is employed to detect the presence or absence of signal in coarse data and a second detector is arranged to be consecutively operative after the sequential detector for the detection of the presence of signal and its resolution within a fine increment of resolution in such multiple-resolution-element radar data.

Yet a further object of the present invention is to provide such an improved multiple-resolution-element radar system employing a sequential detector for the detection of the presence or absence of signal in coarse data and a consecutively operative second detector capable of resolving the presence of significant signal information within a fine increment of resolution and wherein each coarse resolution element represents an integral multiple of fine resolution elements.

A still further object of the present invention is to provide a multiple-resolution-element radar system of improved type employing fine and coarse detectors wherein sequential detection techniques are employed in the coarse detector and upon such coarse detector reaching a decision for "no signal" the radar system is caused to develop a new sequence of data at another antenna beam position.

These and other features, objects and advantages of the present invention will be more fully understood from the description of an embodiment of the present invention which follows and its scope will be pointed out in the appended claims.

The schematic block diagram illustrated in the drawing shows a typical embodiment of the present invention. The two-stage radar system shown comprises a code generator 10, which develops a code fed to a modulation driver 11, which, in turn, encodes the transmitted radar pulses generated by the radar transmitter 12. The output of the radar transmitter is preferably fed to an electronic scan antenna 13 which transmits and receives the radar data. The received radar data is processed in a radar receiver 14 where it is appropriately amplified and fed into a matched filter arrangement 15 which comprises a coarse filter 15a and a fine filter 15b adapted to process the coarse or first order data and the fine or second order data, respectively. The coarse data is fed from the matched filter 15 to a coarse analog-to-digital converter 16 while the fine data is fed from the matched filter 15 to a fine analog-to-digital converter 17. The coarse digital data is then received by a sequential detector 18 while the fine digital data is fed to a fine detector 19 which may be of the sequential detector type or of the fixed sample type. The coarse data detector is of the sequential type, many variations of which are known and used in the art. Typical examples of such sequential detectors are disclosed in detail in a number of patents, a few examples of which are U.S. Pat. No. 3,145,379 titled "Sequential Signal Detector" issued to me Aug. 18, 1964, U.S. Pat. No. 3,206,747 titled "Sequential Data Converter" issued to me Sept. 14, 1965, U.S. Pat. No. 3,171,119 titled "Binomial Sequential Detector" issued jointly to me and Carlos Nuese Feb. 23, 1965, U.S. Pat. No. 3,153,231 titled "Modification of Sequential Detectors for Parallel Operation" issued to me and Robin A. Worley Oct. 13, 1964, and U.S. Pat. No. 3,253,277 titled "Radar System Employing Sequential Analysis" issued to G. W. Preston, et al. May 24, 1966. The sequential type of detector, its configurations, operation, and advantages are well known and since the present inventive concept is not directed to the specifics of one particular sequential detector, no details of the sequential detector circuitry are illustrated. When the coarse sequential detector terminates its operation it has reached one of two possible decisions, either every coarse increment of resolution such as a range bin, for instance, is declared empty indicating the lack of significant signal information in the processed data or at least one of such coarse resolution elements, such as a range bin, is indicated to have significant signal information. If the coarse sequential detector 18 reaches a decision for no significant signal information, the radar system is caused to develop a new sequence of data as, for instance, may be obtained by causing the radar antenna beam to move to another elevation or azimuth position by actuation of the beam position control 20 as in usual and conventional in sequential detection techniques. In the alternative case, however, where the coarse sequential detector 18 reaches a decision indicative of the presence of significant signal information contained within a resolution element such as a coarse range bin, further signal detection is continued by the fine detector 19 of the apparatus for those resolution increments such as fine range bins, corresponding to and embraced within the limits of coarse resolution increment such as the coarse range bin which was indicated to have detected significant signal information. In accordance with the concept of the present invention, the fine data detector may be either a sequential type or a nonsequential type. Numerous examples of nonsequential type radar detectors are well known in the art. The basic design considerations in such nonsequential type radar detectors, as well as detailed analysis of the requisite operative characteristics, are to be found in a great variety of modifications and forms in numerous publications in the scientific literature; two typical examples may be cited as the text titled "Introduction to Radar Systems" by Merrill I. Skolnik published in 1962 by the McGraw-Hill Book Company, Inc., notably, page 430 Section 9.6 titled "Detector Characteristics" through page 439 which includes several schematic diagrams of basic nonsequential type of detectors such as the coherent detector shown in FIG. 9.17 and a two-path detector system shown as FIG. 9.19, and another text titled "Modern Radar" by Raymond S. Berkowitz published 1965 by John Wylie and Sons, Inc., particularly as disclosed and described at pages 576–591 and notably the schematic diagrams of several radar detectors of the nonsequential type as illustrated in FIG. 6–1. When the fine detector 19 terminates its processing of the fine radar data, the presence of significant signal information such as the range location of a target, for instance, will be established within the accuracy of the fine resolution range bins of the fine detector and fed to a radar indicator 21, an appropriate computational device or further processed as may be desired. Upon termination of the fine detector's operation, the radar system will be caused to develop a new sequence of data such as may be generated by moving the radar antenna beam to another position by appropriate control of the electronic scan antenna 13 through the beam position control 20.

As will be appreciated by those skilled and knowledgeable in the art, when relatively few targets are present, the detection process will usually terminate at the first or coarse stage. In a small percentage of cases the second or fine stage will be used and further data developed of the second order or fine order of resolution. The efficiency of the overall radar system is thus determined primarily by the efficiency of the coarse or first order sequential detector which, having relatively few resolution elements, is comparatively very high. In one mode of operation the radar system may be so arranged that the coarse and fine detectors both operate in the initial stage of operation. Determination of this first stage of operation is, of course, controlled by the coarse sequential detector. One possible way to achieve such operation is to have the radar system transmit a coded pulse sequence which, upon reception by the radar receiver, is constructed into a coarse structure by a coarse filter and into a fine structure by a fine filter, such as the coarse and fine filters illustrated in the drawing. Alternatively, the radar system of the present invention could operate with wide pulses and fine pulses on two different frequencies obviating the need for pulse coded sequences in the conventional sense. In yet another alternative mode of operation, the present invention could be caused to operate first with coarse resolution only and then follow consecutively with the fine resolution operation. It is important to note that in any of the alternative examples cited above the radar pulse repetition frequency may be increased depending on how many coarse resolution increments are indicated to have significant signal information within them.

Thus, it may be seen that the present invention has the advantage of employing sequential detection techniques to greatest advantage by availing of the increased sensitivity that may be realized through the use of such sequential detection techniques, yet without impairing the degree of fine resolution which may be achieved in the overall radar system. Moreover, much processing of the second order or fine data developed by the radar system may be eliminated in that only the fine data contained within the coarse resolution indicated to have significant signal information need be processed. Additionally, the concept of the present invention is such that it may be embodied in a variety of different combinations employing the most efficient selected techniques advantageously in the uniquely operative apparatus as disclosed and taught herein. For example, the coarse resolution data may be processed by a bank of sequential detectors of the simple parallel, forced continuation, or other types as may be desirable.

Obviously many modifications and variations of the present invention are possible in the light of the above teachings. It is therefore to be understood that within the scope of the appended claims the invention may be practiced otherwise than as specifically described.

What is claimed is:

1. An improved multiple-resolution-element radar system comprising;
   means for developing multiple-resolution-element data having a first order of resolution;
   means for developing multiple-resolution-element data having a second order of resolution within said first order multiple-resolution-element data, said second order being of substantially finer resolution than said first order;
   a sequential signal detector arranged to receive said first order multiple-resolution-element data, said sequential detector being responsive to said received first order data for producing a first output or a second output indicative of the absence or presence of signal in said first order data, respectively;
   a second detector arranged to receive said second order multiple-resolution-element data, said second detector being operative for resolving the presence of signal within an incremental element of said second order of resolution and producing an output indicative thereof; and
   means responsive to said first output of said sequential detector or said output of said second detector for causing said system to develop a new sequence of multiple-resolution-element data.

2. An improved multiple-resolution-element radar system as claimed in claim 1 wherein said sequential detector and said second detector are consecutively operative for detecting the presence of signal in said first order and said second order multiple-resolution-element data, respectively.

3. An improved multiple-resolution-element radar system as claimed in claim 1 wherein said second detector is responsive to the second output of said sequential detector to actuate said second detector for resolving the presence of signal within an incremental element of said second order of resolution data.

4. An improved multiple-resolution-element radar system as claimed in claim 1 wherein said second detector is of the sequential detector type.

5. An improved multiple-resolution-element radar system as claimed in claim 1 wherein said second detector is not of the sequential detector type.

6. An improved multiple-resolution-element radar system as claimed in claim 1 wherein each said first order resolution element is representative of an integral multiple of second order resolution elements.

7. An improved multiple-resolution-element radar system as claimed in claim 1 wherein said first order and said second order resolution elements comprise coarse and fine range bins, respectively.

8. An improved multiple-resolution-element radar system as claimed in claim 1 wherein said second detector is operatively responsive for resolving the presence of signal within only those first order of resolution incremental elements where the presence of signal has been detected by said sequential detector.

9. An improved multiple-resolution-element radar system as claimed in claim 1 wherein said means for developing multiple-resolution-element data having a first order of resolution is operative at a different frequency than said means for developing multiple-resolution-element data having a second order of resolution.

10. An improved multiple-resolution-element radar system as claimed in claim 1 and including matched filter means for developing said first and second orders of multiple-resolution-element data.

11. An improved multiple-resolution-element radar system as claimed in claim 1 and including means for encoding separate identification for each of said first and second orders of resolution data.

12. An improved multiple-resolution-element radar system as claimed in claim 11 and including means for simultaneously receiving and decoding said encoded first and second orders of resolution data.